(12) United States Patent
Druschel et al.

(10) Patent No.: US 6,287,105 B1
(45) Date of Patent: *Sep. 11, 2001

(54) CONTROLLING ASSEMBLY FOR ADJUSTING LIP GAP

(75) Inventors: Robert L. Druschel, Eau Claire; Steven Jonjak, Chippewa Falls, both of WI (US)

(73) Assignee: Cloeren Incorporated, Orange, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,555

(22) Filed: Jun. 5, 1998

Related U.S. Application Data

(60) Provisional application No. 60/049,973, filed on Jun. 13, 1997.

(51) Int. Cl.[7] .................................................. B29C 47/16
(52) U.S. Cl. ..................... 425/466; 425/190; 425/192 R
(58) Field of Search .................................. 425/141, 381, 425/466, 190, 192 R; 74/89.14, 425

(56) References Cited

U.S. PATENT DOCUMENTS

| 2,168,889 | | 8/1939 | Thomas. | |
|---|---|---|---|---|
| 2,465,482 | | 3/1949 | Rhodes. | |
| 2,780,835 | | 2/1957 | Sherman. | |
| 3,523,599 | * | 8/1970 | Denkowski | 74/425 |
| 3,554,044 | * | 1/1971 | Hoglund | 74/425 |
| 3,694,120 | | 9/1972 | Walton. | |
| 4,032,284 | | 6/1977 | Vermeylen et al. | 425/466 |
| 4,821,596 | * | 4/1989 | Eklund | 74/425 |
| 4,863,361 | * | 9/1989 | Boos | 425/141 |
| 4,978,289 | | 12/1990 | Maejima | 425/466 |
| 5,020,984 | * | 6/1991 | Cloeren et al. | 425/141 |
| 5,287,770 | * | 2/1994 | Mudd | 74/425 |
| 5,456,869 | | 10/1995 | Miles et al. | 425/381 |
| 5,477,752 | * | 12/1995 | West et al. | 74/425 |
| 5,570,606 | * | 11/1996 | Irie | 74/425 |
| 5,582,850 | | 12/1996 | Cloeren et al. | 425/381 |
| 5,679,383 | | 10/1997 | Ryan et al. | 425/141 |
| 6,017,207 | | 1/2000 | Druschel | 425/381 |

FOREIGN PATENT DOCUMENTS 9500273   12/1996   (BE).

OTHER PUBLICATIONS

Cloeren Incorporated Internal Deckle Position Control (1995).

ZERO–MAX Crown Angle Gear Drives literature.

* cited by examiner

*Primary Examiner*—Harold Pyon
*Assistant Examiner*—Joseph Leyson
(74) *Attorney, Agent, or Firm*—Timothy R. Kroboth

(57) ABSTRACT

An extrusion apparatus including a flex lip and a reciprocally movable actuator bar for adjusting the lip gap, is disclosed. Axial movement of the actuator bar advantageously results in control across the full width of the lip gap. In one aspect of the invention, a handwheel or motor is positioned opposite the output end of the extrusion apparatus. In another aspect of the invention, a rotatable shaft of a control assembly is beneficially disposed generally perpendicular to direction of movement of the actuator bar, and advantageously a portion of the shaft is received within an endplate of the extrusion apparatus. In a variation, a control assembly simultaneously exerts a pulling force on one end of the actuator bar and a pushing force on the opposite end of the actuator bar.

20 Claims, 15 Drawing Sheets

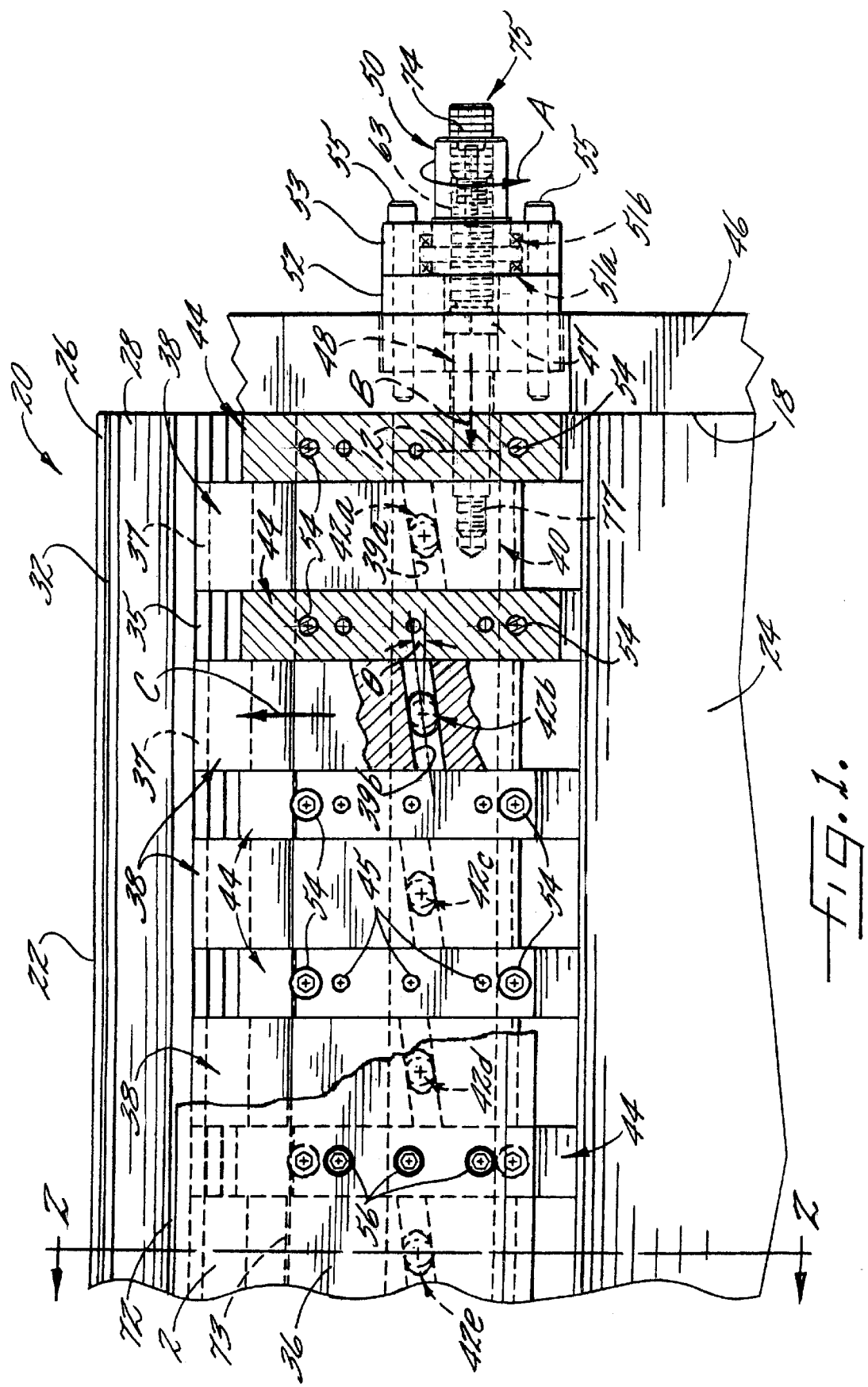

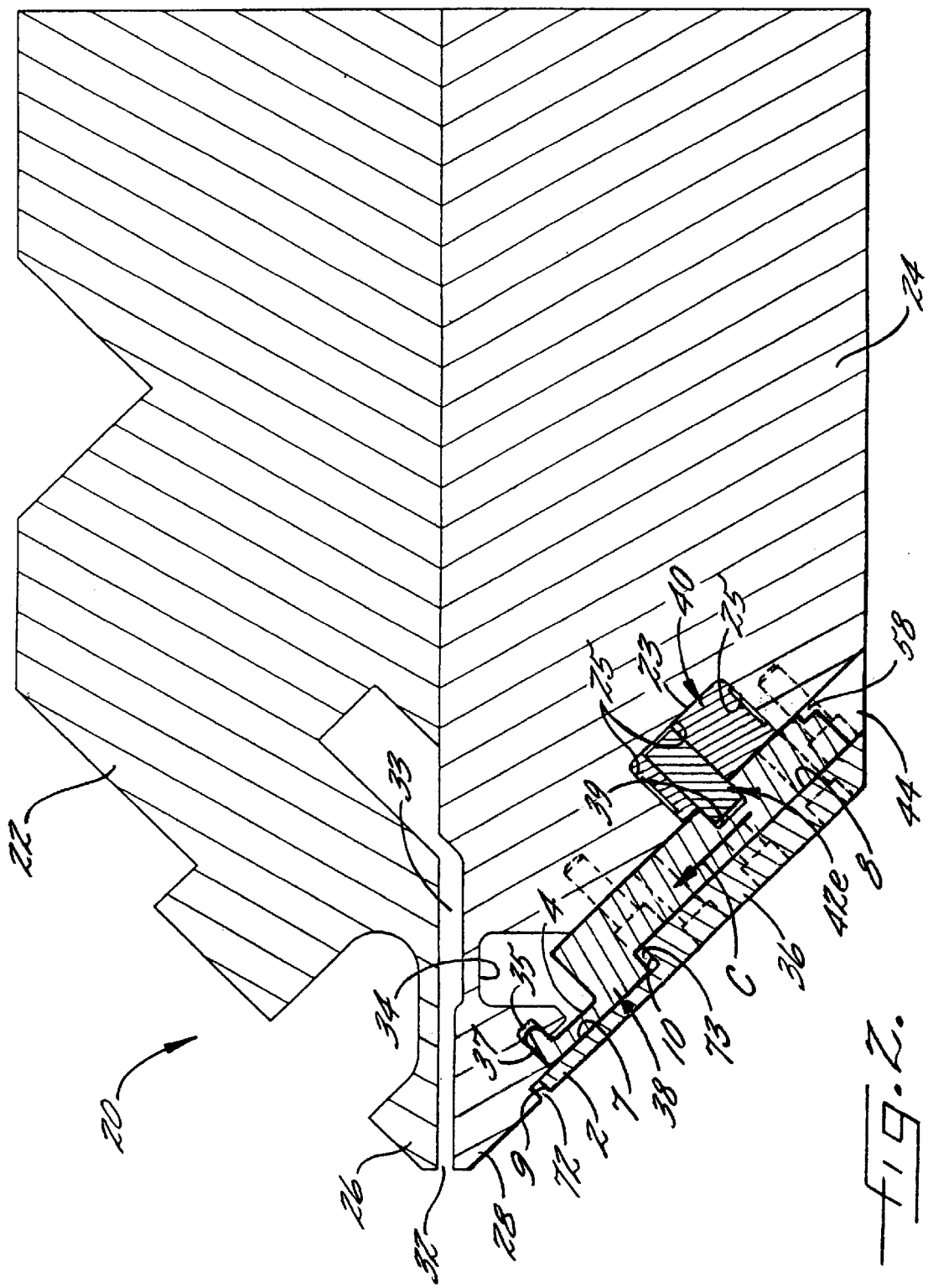

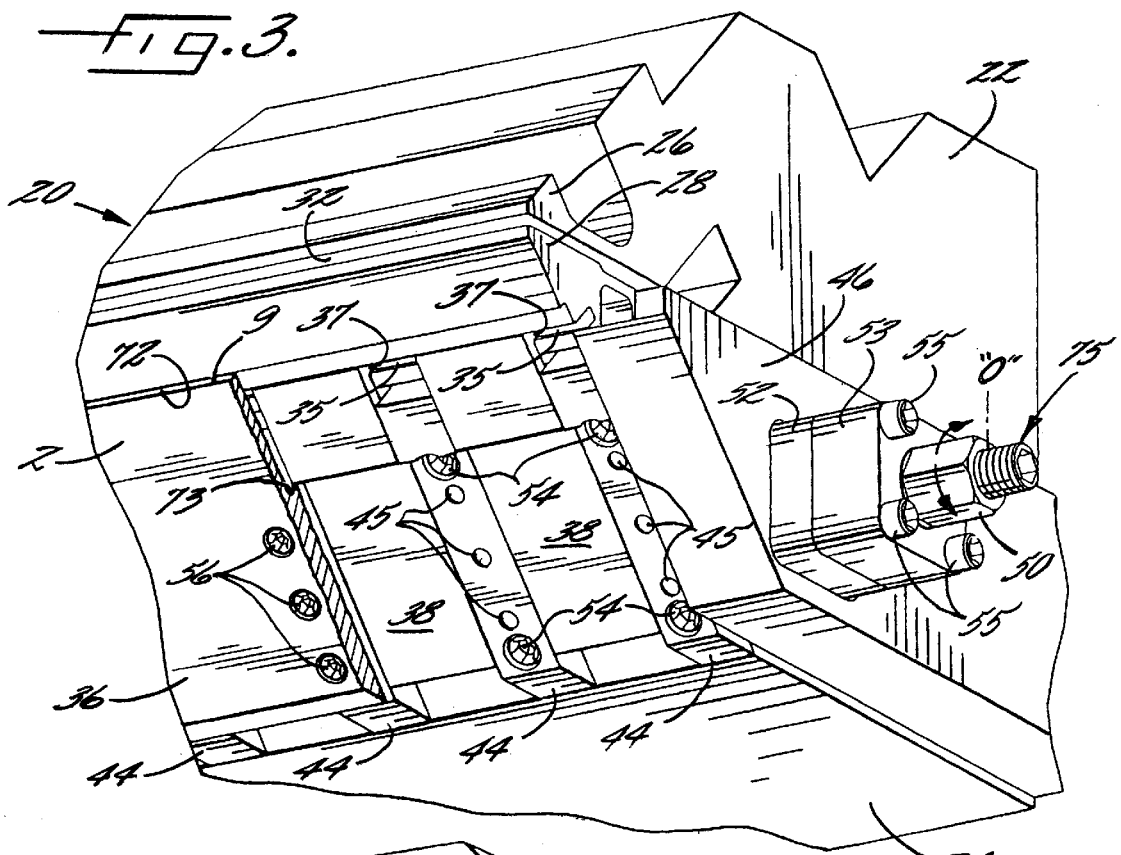

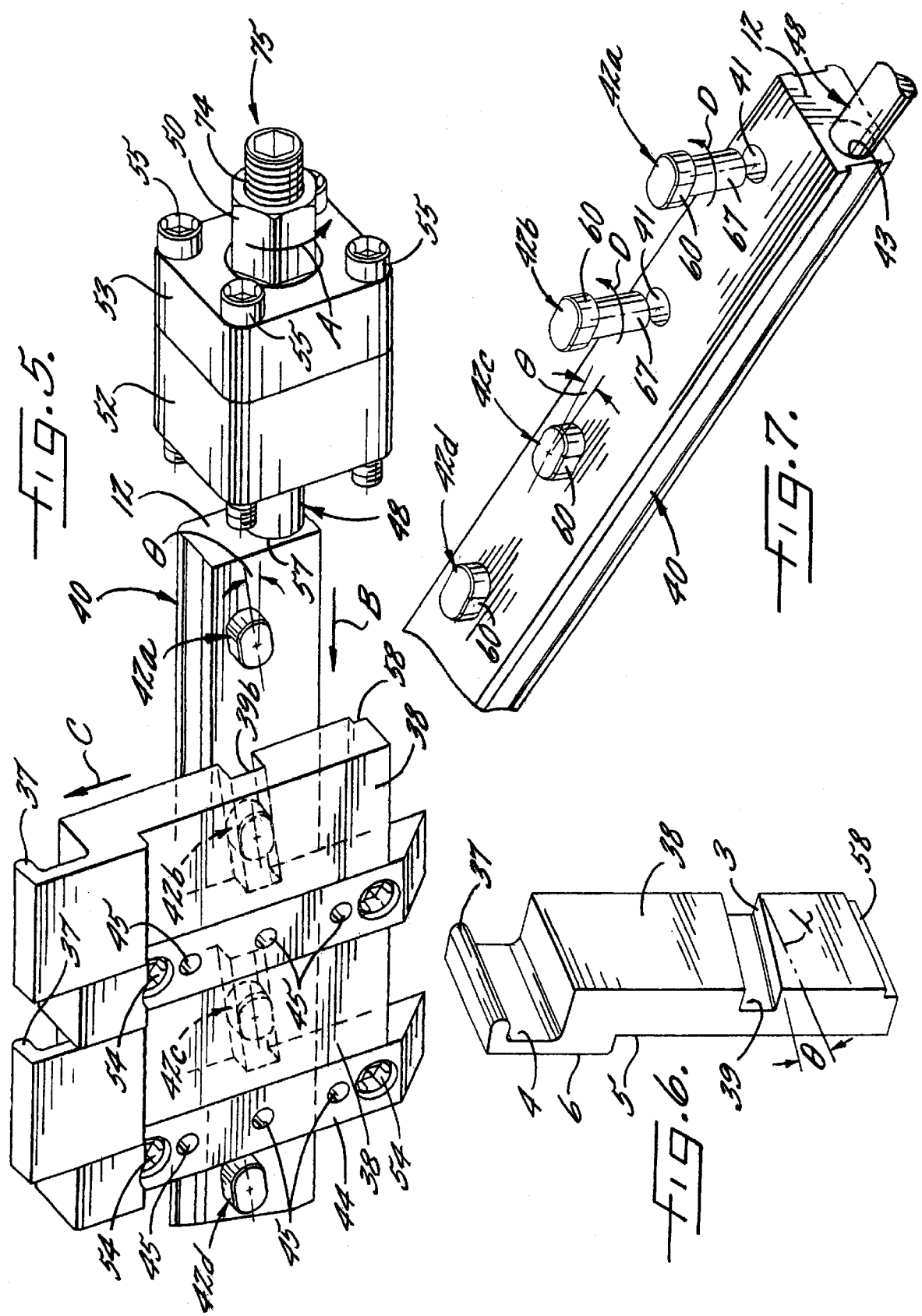

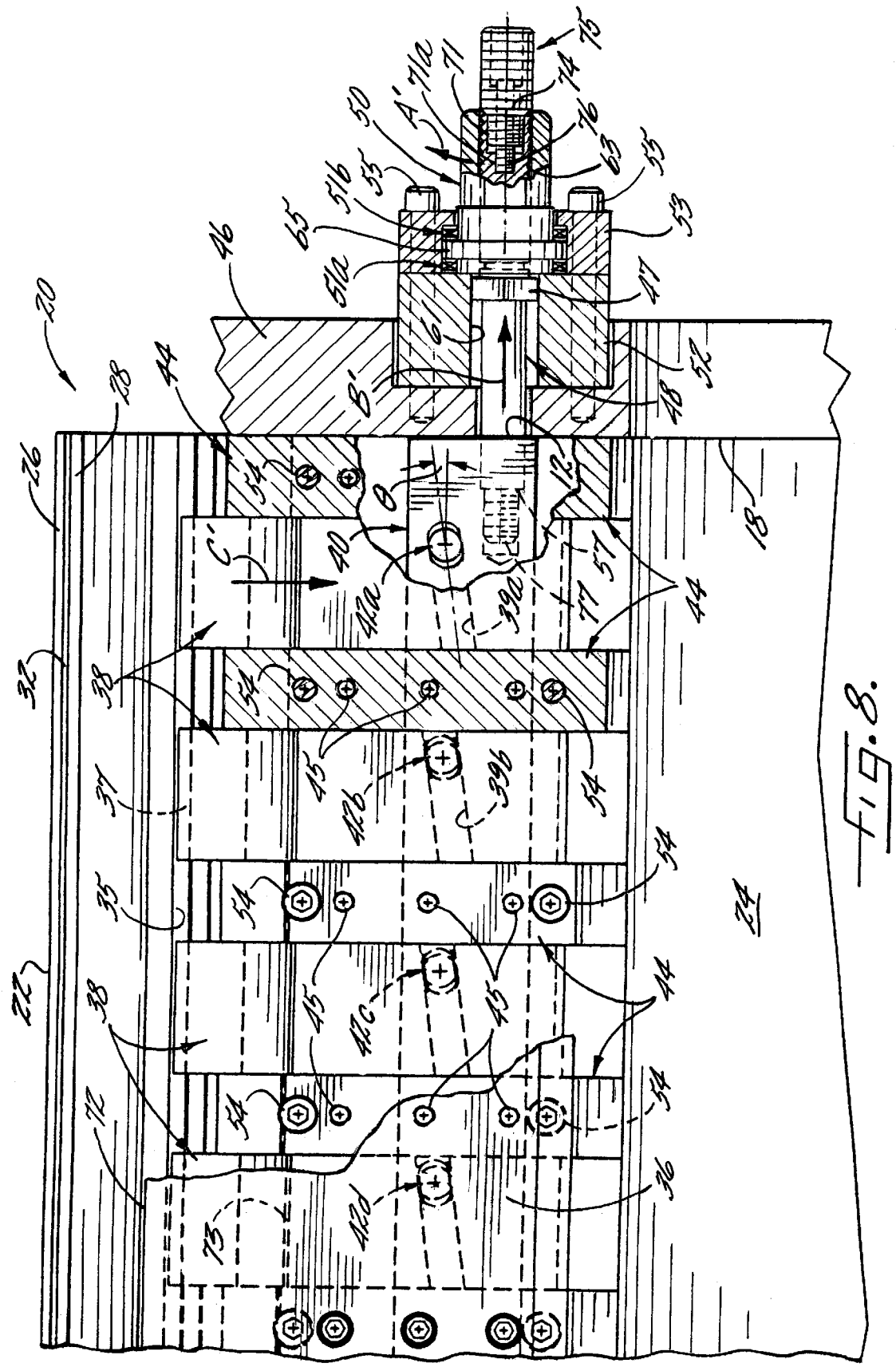

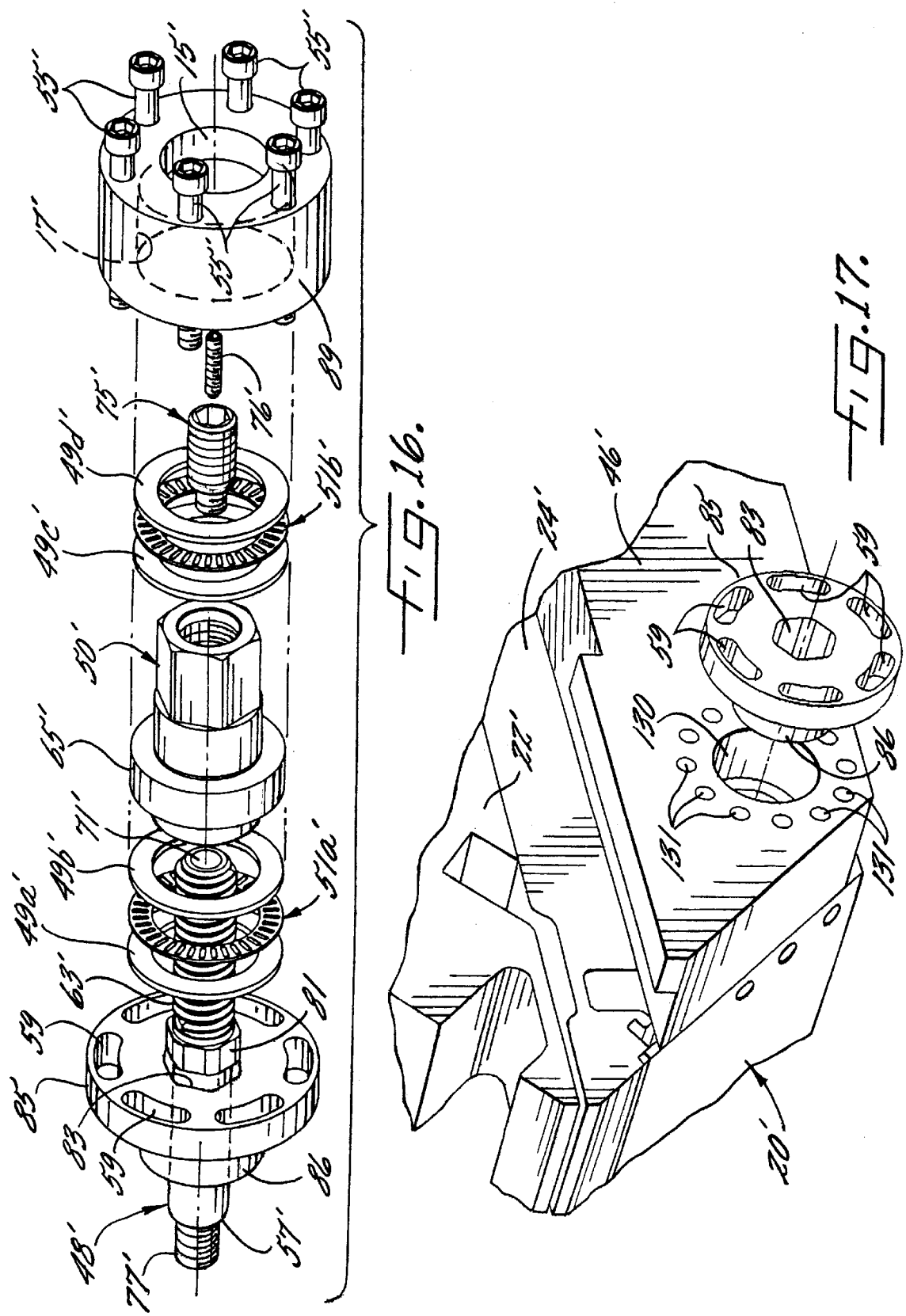

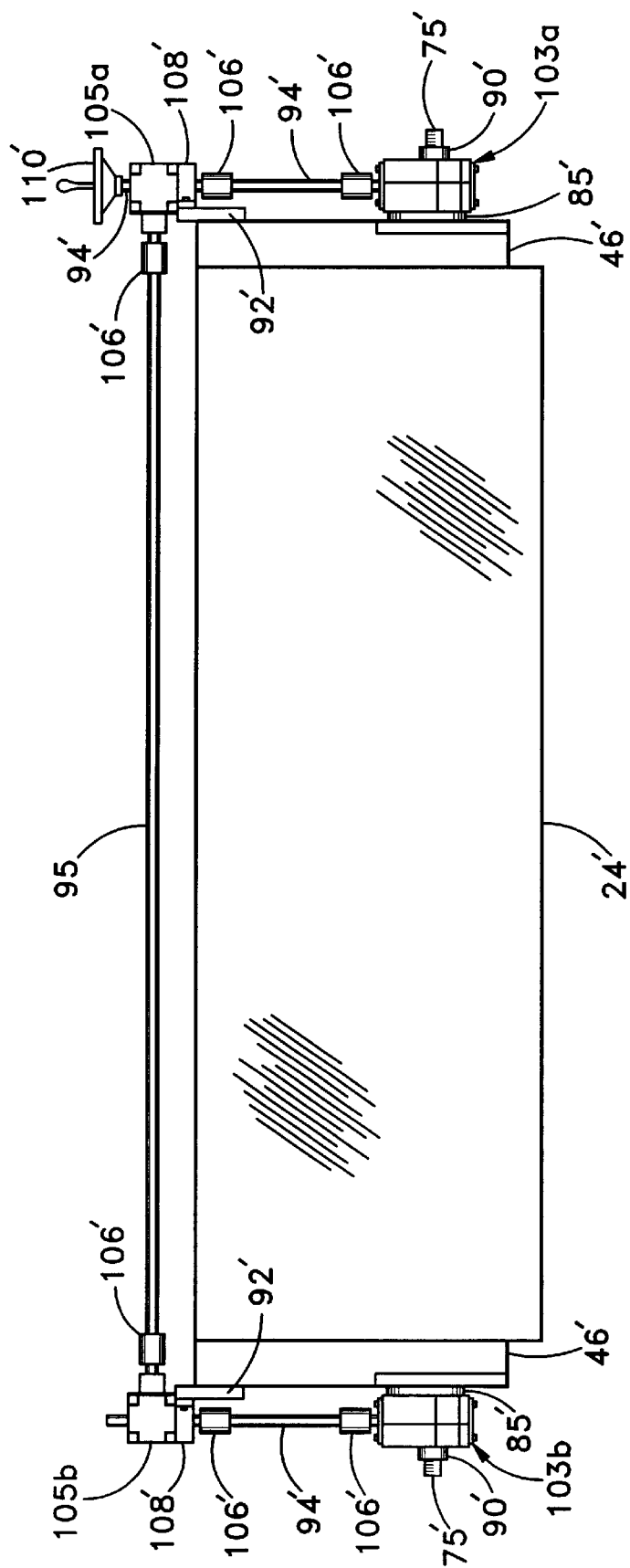

CONTROLLING ASSEMBLY FOR ADJUSTING LIP GAP

REFERENCE TO RELATED PATENT APPLICATION

This patent application claims the benefit of U.S. Provisional Patent Application No. 60/049,973, filed on Jun. 13, 1997.

BACKGROUND OF THE INVENTION

A recent improvement for adjusting the lip gap of an extrusion die having a flex lip, is described in U.S. patent application Ser. No. 08/936,655, filed on Sep. 24, 1997, now U.S. Pat. No. 6,017,207. In that apparatus, an operator attaches a wrench to a rotatable adjustment spool located near the exit slot, and applies force to rotate the spool to adjust the lip. When the die is in operation, pressure in the flow passageway of the die requires an increased force be applied to adjust the lip gap. In addition, the operator may not be able to make a fine adjustment of the lip gap. Additionally, the location of the adjustment spool may result in the operator being near the hot extrudate, limit the space available for the adjustment, or interfere with the space requirements of other equipment.

Accordingly, it is an object of the present invention to provide a control assembly that allows an operator to adjust the lip, yet be further removed from the exit slot and hot extrudate, for instance, to stand behind the die. In this way, worker safety will be improved, and it will be easier to retrofit existing equipment. It is a further object to provide for fine adjustment of the lip. Moreover, it is an object to reduce the force exerted on a gear assembly used for adjusting the lip. Still further objects and advantages will become apparent from a consideration of the description and drawings.

In accordance with the present invention, an extrusion apparatus includes a flow passageway terminating in an exit slot having a gap and defining an output end of the extrusion apparatus, and the gap is formed in part by a flex lip; and further includes a reciprocally movable member operatively connected to the lip for adjustment of the gap. The control assembly includes a gear assembly operatively connected to the reciprocally movable member (or bar) for reciprocally moving the actuator bar, and includes a shaft connected to the gear assembly and in one aspect of the invention, a handwheel or motor positioned opposite the output end of the extrusion apparatus. In another aspect of the invention, the control assembly includes a shaft disposed generally perpendicular to a recess in which the actuator bar is disposed, and a portion of the shaft is supported by a recess of an end plate of the extrusion apparatus.

In a variation of the invention, a first gear assembly is operatively connected to an end of the actuator bar for moving the actuator bar in a first direction, and a second gear assembly is operatively connected to an opposite end of the actuator bar for likewise moving the actuator bar in the first direction. Beneficially, the first gear assembly and second gear assembly are simultaneously controlled to move the actuator bar in the first direction. Advantageously, as before, an input shaft for a gear assembly is oriented generally perpendicular to the direction of movement of the actuator bar, and an input end of the input shaft extends in a direction opposite to the output end of the extrusion apparatus.

BRIEF DESCRIPTION OF THE DRAWINGS

FIG. 1 is a partial front elevation view of an extrusion apparatus to which the present invention may be applied;

FIG. 2 is a cross-sectional view taken along the line 2—2 of FIG. 1;

FIG. 3 is a partial front and bottom perspective view of the right hand side of the extrusion apparatus of FIG. 1;

FIG. 4 is a partial front and bottom perspective view of the opposite end of the extrusion apparatus of FIG. 1;

FIG. 5 is a partially exploded front perspective view of the actuator means of the extrusion apparatus of FIG. 1, with parts removed;

FIG. 6 is a perspective view of a push/pull block of the actuator means of FIG. 5;

FIG. 7 is a partial perspective view of an actuator bar of the actuator means of FIG. 5, with some pins exploded for detail;

FIG. 8 is a partial front elevation view similar to FIG. 1, with portions cutaway and in section, showing the actuator bar pulled to the right hand side of the apparatus of FIG. 1;

FIG. 16 is an exploded perspective view similar to FIG. 9, of components of the modified control assembly of FIG. 14;

FIG. 17 is an exploded perspective view of features seen in FIG. 15;

FIG. 22 is a view from below of an additional preferred embodiment of a control assembly in accordance with the present invention.

DETAILED DESCRIPTION

Figure 9:
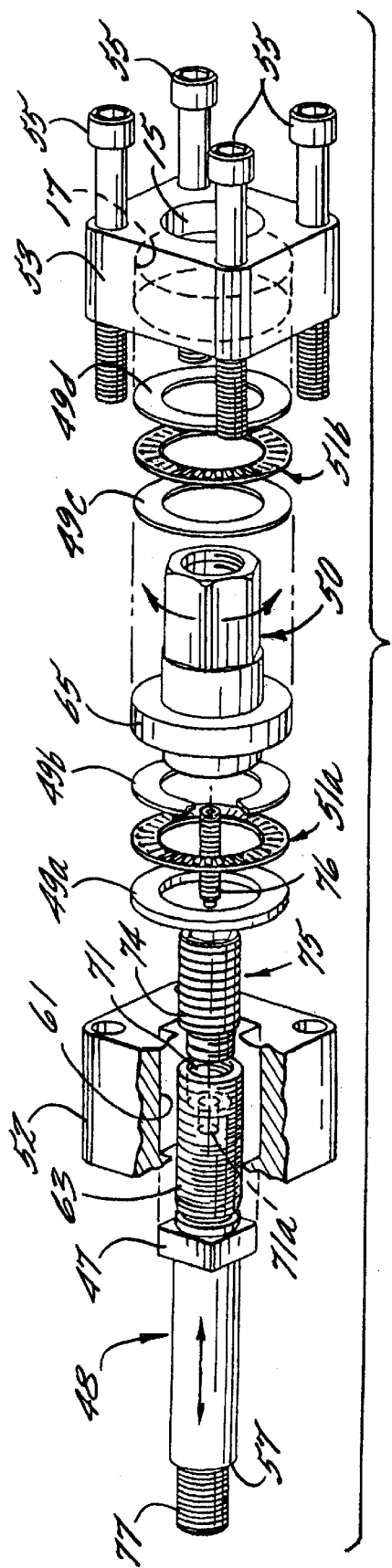
FIG. 9 is an exploded perspective view of components used for reciprocally moving the actuator bar, in the apparatus of FIG. 1.

As shown in FIGS. 1 to 4, an extrusion die apparatus 20 has an upper body 22 and a lower body 24, and particularly referring to FIG. 2, defines a flow passageway 33, which terminates in an exit slot 32 formed by lips 26,28. Plastic or other material flows through passageway 33 to exit at exit slot 32. Thermoplastic and other flowable materials including flowable food products may be extruded, and as needed, the plastic or other substance may be heated to flow through passageway 33. Lip 28 has a necked down portion or hinge defined by a recess 34, which allows flexibility of lip 28 for adjustably varying the exit slot 32, thereby controlling the thickness of the extruded product. Exit slot 32 extends along the width of the extrusion apparatus. It will be understood that instead of lip 28, hinged lip 26 could be, as described below, controlled by an actuator bar.

A cover plate 36 advantageously covers push/pull blocks 38 and spacer mounts 44. Spacer mounts 44 separate push/pull blocks 38, and are attached to extrusion die 20, and in particular to lower body 24, by bolts 54. Conveniently, two bolts 54 secure each spacer mount 44. Spacer mounts 44 define the areas in which push/pull blocks 38 are disposed, and resist lateral movement of push/pull blocks 38. Spacer mounts 44 include apertures 45 for attachment of cover plate 36 to lower body 24 by bolts 56. An upper portion 2 of cover plate 36 beneficially is not fastened to the spacer mounts. This allows cover plate 36 to flex. Cover plate 36 prevents push/pull blocks 38 from popping out of position. In this way, push/pull blocks 38 are held in place, yet can move up and down or vertically within the defined spaces or pockets. Other holding means may include clamps, pins, screws, sleeves, pockets, guides, or other structures for positioning the push/pull blocks 38.

As best shown in FIGS. 5 and 6, push/pull blocks 38 each include an angled slot 39. Slots 39 are provided at an angle $\theta$, defined in FIG. 6 as the angle between a lower face 3 of slot 39 and a broken line L. The angle $\theta$ is also depicted in FIGS. 1, 5 and 7, and can be understood to be the angle of deviation from a generally horizontal position. The angle may vary, for example, according to the thickness of the neck defined by recess 34. If the neck is narrow, i.e., if there is little thickness, then lip 28 tends to flex relatively more easily, and the angle may be relatively greater. On the other hand, when the neck is relatively thicker, the angle will typically be relatively less. As the angle becomes relatively greater, the flex area may need to change in shape as well as thickness.

An operator may control the amount of flex by using push/pull blocks having slot angles of varying degrees. A preferable slot angle is 6 to 9 degrees. An angle of lesser degree produces a range of flex or gap control that is relatively smaller than a range produced by an angle of greater degree. An operator may therefore vary the range of flex or gap control by selecting push/pull blocks having the desired slot angle.

If desired, slots 39 may be cut with a reverse angle. For instance, instead of sloping down from left to right as shown in FIG. 6, slots 39 may be cut to slope down from right to left. Reversing the slot angle reverses the directional movement of push/pull blocks 38. As will become understood, whether slots 39 slope from left to right or from right to left, affects whether an actuator bar 40 is pushed or pulled to close or open the lip gap.

Also with reference to FIGS. 1 to 4, push/pull blocks 38 each beneficially include a finger 37 defined by a recess 4 (see FIG. 6 in particular), for insertion into a groove 35 of lower lip 28. Groove 35 runs the width of the lower lip. Groove 35 accommodates a plurality of fingers 37 so that a plurality of push/pull blocks 38 may be utilized. Because of fingers 37, blocks 38 can exert both "push" and "pull" actions on lower lip 28. However, "push only" lip adjustment members may be used.

Referring particularly to FIG. 6, blocks 38 each have a stepped outer surface which includes an outer surface 5 stepped down from an outer surface 6 disposed opposite to recess 4, which defines finger 37. In like manner, referring particularly to FIG. 2, cover plate 36 has a stepped inner surface which includes an inner surface 7 which covers outer surface 6, and a raised inner surface 8 which covers stepped down outer surface 5 of blocks 38. Likewise, as best shown in FIGS. 3 to 5, spacer mounts 44 have a stepped outer surface similar to that of blocks 38. When upper portion 2 of the cover plate is fastened by fasteners 66 (only one shown) to mounting blocks 44 (only one shown) as shown in the FIG. 12, inner surface 7 of upper portion 2 may be beneficially channeled so as to be provided with a plurality of channels or recesses disposed over push/pull blocks 38 for facilitating up and down movement of blocks 38. However, even in the absence of the channeling and with reference to FIG. 12, upper portion 2 flexes between fasteners 66 for the upper portion and exit slot 32.

Referring again to FIG. 2, upper portion 2 of the cover plate extends beyond fingers 37 of push/pull blocks 38 and into contact with lower lip 28. As seen in the Figure, the extension of the cover plate is seated in a recess in the lower lip, and an exterior gap 72 is provided between an end 9 of the extension and an opposing face of the recess. Similarly, an interior gap 73 is provided between a face 10 of the cover plate and an opposing face of push/pull block 38. Gaps 72,73 widen as the push/pull blocks 38 are moved in direction C. Gaps 72,73 narrow when the push/pull blocks 38 are moved directionally opposite to direction C.

In accordance with the invention, as shown best in FIGS. 1, 5 and 8, each push/pull block 38 receives a pin 42 at an angled slot 39. FIG. 1 illustrates pins 42a–e matched with, and inserted into, corresponding angled slots 39 of push/pull blocks 38. Referring also to FIG. 7, pins 42 include head portions 60 removably insertable into angled slots 39, and shaft portions 67 removably insertable into smooth bores 41 of actuator bar 40. Preferably, head portions 60 are elongated with opposing parallel surfaces and opposing radial surfaces, as shown in FIG. 7, and shafts 67 are round and rotatably engaged in bores 41 spaced along the length of actuator bar 40 to accommodate for different angles of angled slots 39. Rotatable engagement facilitates insertion of elongated heads 60 of pins 42 into angled slots 39. FIG. 7 illustrates rotation of pins 42a–b in a counterclockwise direction D, until the angle $\theta$ is reached as illustrated for pin 42c. Thus, pins 42 are rotatably engaged in actuator bar 40 for positioning of heads 60 at the angle $\theta$ or another suitable angle that corresponds to the angle of slots 39. As a result, connection of push/pull blocks 38 with generally laterally sliding actuator bar 40 is facilitated. To use a push/pull block having an angled slot of a greater or lesser angle than $\theta$, the operator simply rotates the corresponding angle pin to match the different angle. There is no need to machine a new actuator bar, or to modify components of the actuator bar. However, in certain applications, it may be beneficial for pins 42 to be fixed to, and non-rotatably connected with, actuator bar 40.

As indicated, heads 60 insert into angled slots 39 for movement within the slots. By using an elongated head instead of a rounded head, a greater surface area of contact between pins 42 and angled slots 39 is provided, and as shown in FIGS. 1, 5 and 8, opposing flat surfaces of heads 60 provide the contact with angled slots 39. Use of an elongated head instead of a round head also reduces wear on slots 39 because forces are distributed over the greater contact surface area resulting from the flat surfaces of the elongated head. However, using a rounded head instead of an elongated head, would reduce the need to orient the head to the angle of the angled slot 39. Pins 42 may vary in size, to be of greater or smaller size, without modifying the actuator bar 40 or push/pull blocks 38 other than by modifying angled slots 39 and bores 41 of activator bar. A relatively larger pin 42 can handle more force in high pressure applications.

Pins 42 are preferably made from or treated with a low friction material. A low friction material such as Aluminum Bronze is preferred for reducing friction which can enhance the ease of operation without jeopardizing durability.

Upon removing cover plate 36, push/pull blocks 38 are exposed, yet remain in position because of being held in place by groove 35, spacer mounts 44, and pins 42. Blocks 38 contact die body 24. With the plate removed, individual blocks 38 may be removed and replaced. If necessary, a screwdriver or pry tool may be used to assist the removal of individual blocks 38. To this end, the push/pull blocks preferably each include a screwdriver slot 58, shown best in FIGS. 2 and 6.

With continued reference to FIG. 2 in particular, actuator bar 40 is situated in a generally transversely disposed recess 23 in lower body 24, which allows for generally lateral, but not vertical movement, of bar 40. Walls 25 define recess 23. Generally lateral movement of the actuator bar in the recess causes push/pull blocks 38 to move generally perpendicularly to close or open lip gap 32, depending upon the direction of the generally lateral movement. As best shown in FIGS. 5, 7 and 8, an adjustment stud 48 connects to an end of the actuator bar to effect the generally lateral movement; and referring particularly to FIG. 8, a threaded bore 43 in the end of the actuator bar receives a threaded end 77 of adjustment stud 48.

A variety of control assemblies for actuator bar 40 and push/pull blocks 38 may be employed, and may be single point adjusting means or means activated from a single point. With reference particularly to FIGS. 8 and 9, a useful control assembly for this purpose, is shown. As noted, threaded end 77 of adjustment stud 48 connects adjustment stud 48 with actuator bar 40; and in addition, adjustment stud 48 passes through an appropriately sized opening in side plate 46 for connection with other components.

Adjustment stud 48 includes a non-circular portion 47 located between end 77 and an opposite threaded end 63. Non-circular or nut portion 47 may have a variety of shapes including but not limited to a square, as depicted, or a hexagon. A locking block 52 includes a throughbore 61 suitably of the same cross-sectional shape as non-circular portion 47, and sized to receive portion 47 and allow adjustment stud 48 and portion 47 to freely reciprocally move within locking block 52, yet prevent nut portion 47 from rotating within bore 61. Bore 61 extends through locking block 52, conveniently through the center portion; and adjustment stud 48, in particular non-circular portion 47, is inserted into and disposed within throughbore 61 to prevent rotation of adjustment stud 48.

An adjustment nut 50 includes a threaded bore, best shown in FIG. 8, for engaging threaded end 63 of adjustment stud 48. Thrust needle roller bearings 51a,51b, sandwiched between thrust washers 49a,49b and 49c,49d, respectively, are positioned on each side of a flange 65 of adjustment nut 50. A retaining plate 53 includes a bore 15, conveniently centrally located, through which the adjustment end of adjustment nut 50 projects and an appropriately shaped recess 17 which receives and fits over flange 65 of adjustment nut 50 and washers 49 and bearings 51. Side plate 46 includes a shaped recess for receiving locking block 52; and bolts 55 pass through peripherally located bores in retaining plate 53 and aligned peripherally located bores in locking block 52, and are threaded into threaded bores in plate 46, to secure the actuator means-controlling mechanism to side plate 46. In this way, locking block 52 is mounted for preventing rotation of non-circular portion 47 and of adjustment stud 48, and hence unthreading of stud 48 from actuator bar 40.

Thrust bearings 51a,51b reduce the rotational friction between adjustment nut 50 and locking block 52, and between adjustment nut 50 and retaining plate 53. Use of the thrust bearings results in easy and smooth adjustment which leads to better repeatability and accuracy.

In some instances when internal pressures become great, an extruder feeding material to the apparatus must be shut off or idled down to reduce pressure at the die lips so that the lip gap can be reduced. Heavy duty thrust bearings may be used to accommodate operation without reduction of the extruder pressure, but such bearings have been found to be very large and unworkable. An operator may use thrust bearings 51 in conjunction with reduction of extruder pressure, to accommodate for closing of lip gap 32. Opening of lip gap 32 is not problematic since internal pressures assist lip gap widening.

Thrust needle roller bearings 51 can be used on short length dies where the internal pressure placed on the bearings is not great. However, most dies will require use of "washer type" thrust bearings in place of needle roller bearings 51. Thrust needle roller bearings 51 contain small rollers (not shown) which circle the face of the bearing and fan outward from the center point of the bearing. A washer type thrust bearing can be made of a slippery material and sandwiched between thrust washers 49. The washers may then be lubricated. While a washer type thrust bearing may not turn as easily as a needle type bearing, the washer type will not crush. Washer type bearings can be made of hardened or low friction material, and can be purchased or fabricated to suit the needs of the user.

When adjustment nut 50 is rotated, the extent of threaded end 63 of adjustment stud 48 within the threaded bore of adjustment nut 50, increases or decreases and this moves nut portion 47 in like direction within locking block 52. This generally lateral movement of adjustment stud 48 moves actuator bar 40 in like direction so as to move push/pull blocks 38 generally perpendicular to the generally lateral movement to adjust the flexible lip 28, with the direction of movement of lip 28 depending upon the direction of rotation of adjustment nut 50. As indicated in FIG. 1, counterclockwise rotation of adjustment nut 50 in a direction A pushes actuator bar 40 in a direction B and causes push/pull blocks 38 to move in a direction C, reducing the lip gap; whereas as indicated in FIG. 8, clockwise rotation of adjustment nut 50 in a direction A' pulls the actuator bar in a direction B' and causes push/pull blocks 38 to move in a direction C', increasing the lip gap. Adjustment stud 48 maintains position until adjustment nut 50 is further rotated.

With continued reference to FIG. 8, when pulled generally laterally, actuator bar 40 will stop travel when its face 12 abuts a face 18 of side plate 46. Beneficially, this abutment occurs before pins 42 abut spacer mounts 44, and as a result, this eliminates side force on pins 42. If desired, however, actuator bar 40 can be sized so that actuator bar 40 and pins 42 abut movement limiting structures at the same time. Similarly, when actuator bar 40 is pushed generally laterally, actuator bar 40 may abut a like plate positioned opposite to side plate 46, and this abutment will advantageously occur prior to abutment of pins 42 with spacer mounts 44 so that side force on pins 42 is also eliminated in this instance. Also if desired, a stop member can be attached to an end of actuator bar 40 so that contact of the stop member with face 12 limits the lateral movement of the actuator bar.

Because a die apparatus is internally pressurized to pass material through the flow passage way 33, a relatively large amount of force must be applied to actuator bar 40 to reduce the lip gap opening. Beneficially, actuator bar 40 is thus pushed, not pulled, to close lip gap 32. When an operator rotates adjustment nut 50 in counterclockwise direction A, as shown in FIG. 1, an adjustment stud shoulder 57 bears upon actuator bar 40; whereas, when adjustment nut 50 is rotated in opposite clockwise direction A' shown in FIG. 8, the securing threads of end 77 bear the lateral force. Push/pull blocks 38 with angled slots 39 which slant as shown in FIG. 6, function to close the lip gap when shoulder 57 pushes on actuator bar 40. If angled slots 39 were slanted in a direction opposite to that shown in FIG. 6, securing threads of end 77 would bear the lateral force exerted to close lip gap 32. If desired, push/pull blocks 38 can be easily changed so that rotation of adjustment nut 50 in clockwise direction A', closes the lip gap 32. Shoulder 57 reduces "slop" or "backlash" which would otherwise result from the threading of adjustment stud 48 into actuator bar 40. The result is better calibration when changing the direction of rotation of adjustment nut 50. Adjustment nut 50 and other actuator bar control components may, of course, be on the other side of the apparatus.

Rotation of adjustment nut 50 in counterclockwise direction A as shown in FIG. 1, moves non-circular portion 47 generally laterally within locking block 52 to cause shoulder 57 to push actuator bar 40, which in turn causes actuator bar 40 to slide in direction B as shown. When sliding actuator bar 40 moves generally laterally in direction B, push/pull blocks 38 are forced generally perpendicularly in direction C. This force pushes fingers 37 upward on groove 35 which in turn causes lip 28 to flex upward. Upward flexing of lip 28 causes lip gap 32 to be reduced. Rotation of adjustment nut 50 results in simultaneous adjustment of all push/pull blocks 38 along the entire lip width, thus resulting in uniform flex of lip 28 when all angles are the same. The selected position of lip 28 is maintained until adjustment nut 50 is adjusted further.

Referring to FIG. 8, when adjustment nut so is rotated in opposite clockwise direction A', reverse forces cause push/pull blocks 38 to pull on lower lip 28 and lip gap 32 to increase. Thus, depending on whether adjustment nut 50 is rotated counterclockwise or clockwise, push/pull blocks 38 push or pull lip 28 to reduce or increase lip gap 32, respectively. If desired, the threading can be reversed for reverse operation. For instance, a user may wish to rotate adjustment nut So in direction A to cause the lip gap 32 to increase. In such case, the threads and angles can be reversed, i.e., manufactured to be either right-handed or left-handed threads.

An operator may select a variety of angles for the angled slots 39, and to this end, selectively replace certain push/push blocks. This allows an operator further control and options for adjustment of the lip gap. If desired, an operator may select an array of push/pull blocks 38 that have different angled slots 39, and in so doing, may mix and match to preference. For instance, the operator may select a particular array for profiling, for example, to create a "smile" or "frown" profile of lip gap 32. If desired, push/pull blocks with angled slots of 8 or 9 degrees at the end locations of the gap opening, could be combined with push/pull blocks with angled slots of 6 or 7 degrees through the intermediate location. Additionally, an array of push/pull blocks with different angled slots may be used to provide a uniform gap width in the case of variability in an otherwise uniform gap opening. An array can comprise any variation of angled slots that the operator may choose.

As indicated in the drawing, extrusion die 20 includes a plurality of push/pull blocks 38 spaced apart along its width. Push/pull blocks 38 exert force on lip 28 at multiple locations along groove 35, which also runs the width of extrusion die 20, to provide an adjustment of the exit slot along the entire slot width, in response to rotation of adjustment nut 50. Thus, a single adjustment point is beneficially used.

With continued reference to FIGS. 8 and 9 in particular, measuring indicator 75 includes a plurality of circular graduations 74 on a portion of its exterior peripheral surface and extends from adjustment nut 50. Indicator 75 includes a threaded male end for engagement with a threaded bore 71 of end 63 of adjustment stud 48. The threaded male end is of smaller diameter than the graduation-bearing portion of indicator 75. Indicator 75 moves with end 63 of adjustment stud 48, and therefore, as the extent of end 63 within adjustment nut 50 increases or decreases, the number of exposed graduations increases or decreases. An operator may therefore determine the movement of adjustment stud 48 by observation of the number of exposed graduations 74. Indicator 75 can be easily adjusted by rotation, so that a calibration mark 74, preferably designated as "O", shown in FIG. 3, is aligned flush with the adjustment nut 50 when lip gap 32 is in a free state position. After indicator 75 is calibrated, a calibration set screw 76, which is threaded through a bore in indicator 75, is bottomed into threaded bore 71a in end 63 of adjustment stud 48, to lock indicator 75 into position. To recalibrate, set screw 76 can be loosened and indicator 75 can be rotated for readjustment.

Figure 10:
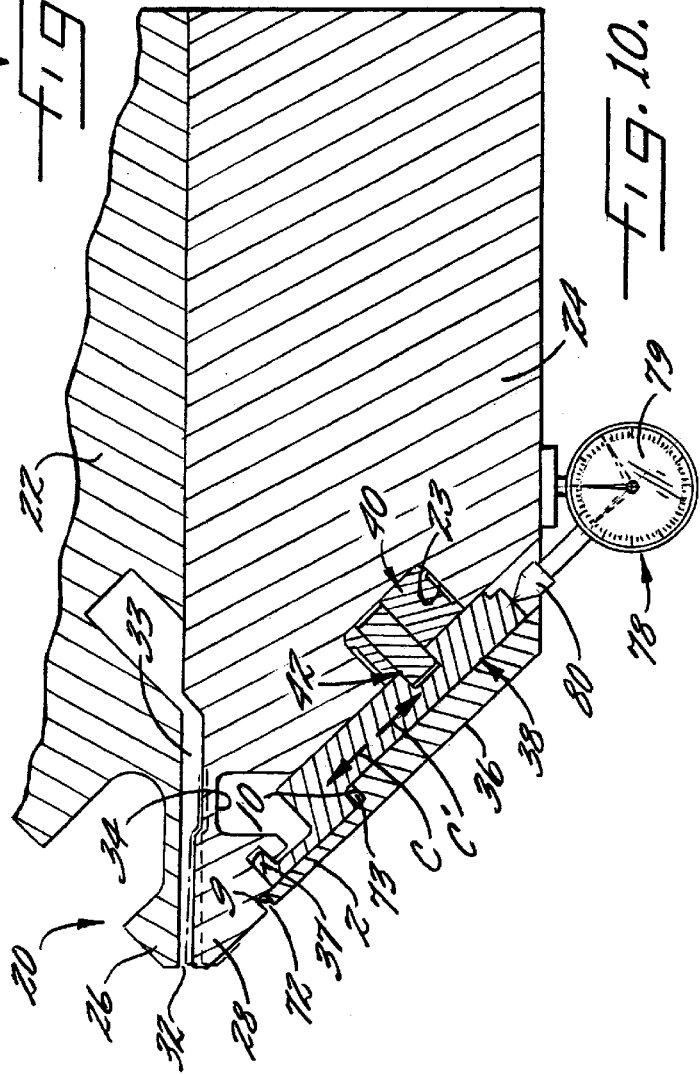
FIG. 10 is a cross-sectional view similar to FIG. 2, relating to measuring movement of the push/push blocks.

The apparatus may include a mechanical measurement indicator 78 shown in FIG. 10, for indicating push/pull block movement. Indicator 78 has a face scale 79, which indicates the amount of movement of indicator arm 80, which conveniently abuts push/pull block 38. A plurality of indicators 78 may be employed along the width of the apparatus. Face scale 79 is beneficially calibrated to correspond to an actual gap opening at exit slot 32. As indicated in phantom in FIG. 10, the needle of the face scale will move in one direction as the lip gap is decreased and in the opposite direction as the lip gap is increased. Instead of a mechanical measurement indicator, an electrical measurement indicator such as a linear transducer, may be used.

Figure 11:
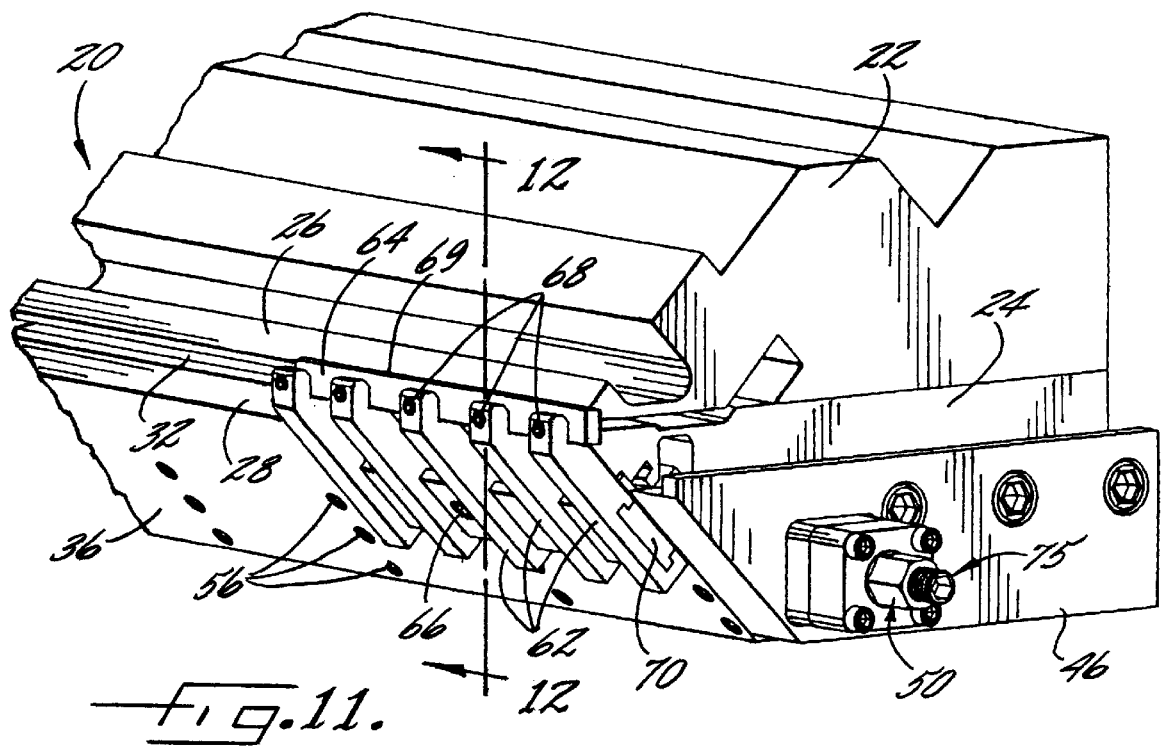
FIG. 11 is a partial perspective view of the extrusion apparatus of FIG. 1, with an external deckle attached to the right side of the exit slot.
Figure 12:
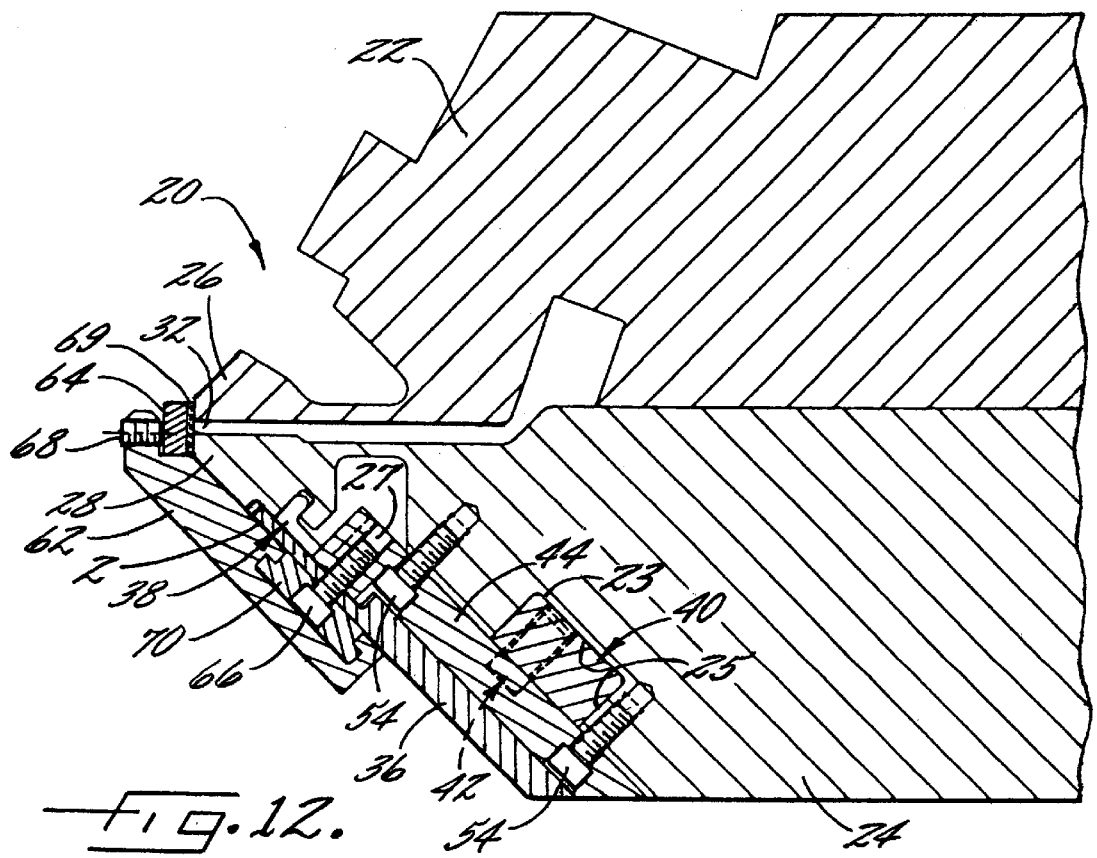
FIG. 12 is a cross-sectional view taken along the line 12—12 of FIG. 11.

With reference to FIGS. 11 and 12, an external deckling bar 64, if desired, may be used. Deckling bar 64 includes a conventional sealing strip 69, typically a fiber/resin composite, which abuts or covers exit slot 32 to dam off a portion of the gap opening 32. To hold deckling bar 64 in place, a T-bar 70 is attached to spacer mounts 44 by threaded T-bar bolts 66, which each pass through an access hole in an upper portion 2 of cover plate 36 and into threads of deckle tapped holes 27 (only one shown) of spacer mounts 44. The length of T-bar 70, the particular spacer mounts to be used to secure the T-bar, and the number of spacer mounts to be used, are determined by the width of the exit slot to be covered by deckling bar 64. Because T-bar 70 is secured to spacer mounts, any interference with operation of the push/pull blocks 38 and of deckling bar 64 is reduced. Deckling blocks 62, which include set screws 68 for securing deckle bar 64 into position and against lips 26 and 28, are engaged by, and held in place by, T-bar 70. The number of deckle blocks 62 to be used, will vary according to the extent of the exit slot 32 to be deckled. A recess in each of deckle blocks 62 receives deckle bar 64. A variety of sizes and designs of deckling may be used including varieties known as Bolt-on Block Off, Yoke, Adjustable Cantilever Wedge Type, and Adjustable Power Wedge Type.

As push/pull blocks 38 are adjusted, deckling bar 64 beneficially maintains a constant seal over the gap and is not subject to tipping or buckling due to adjustment of the lip gap. A user may therefore adjust the lip gap without concern of disrupting deckling bar 64.

Figure 13:
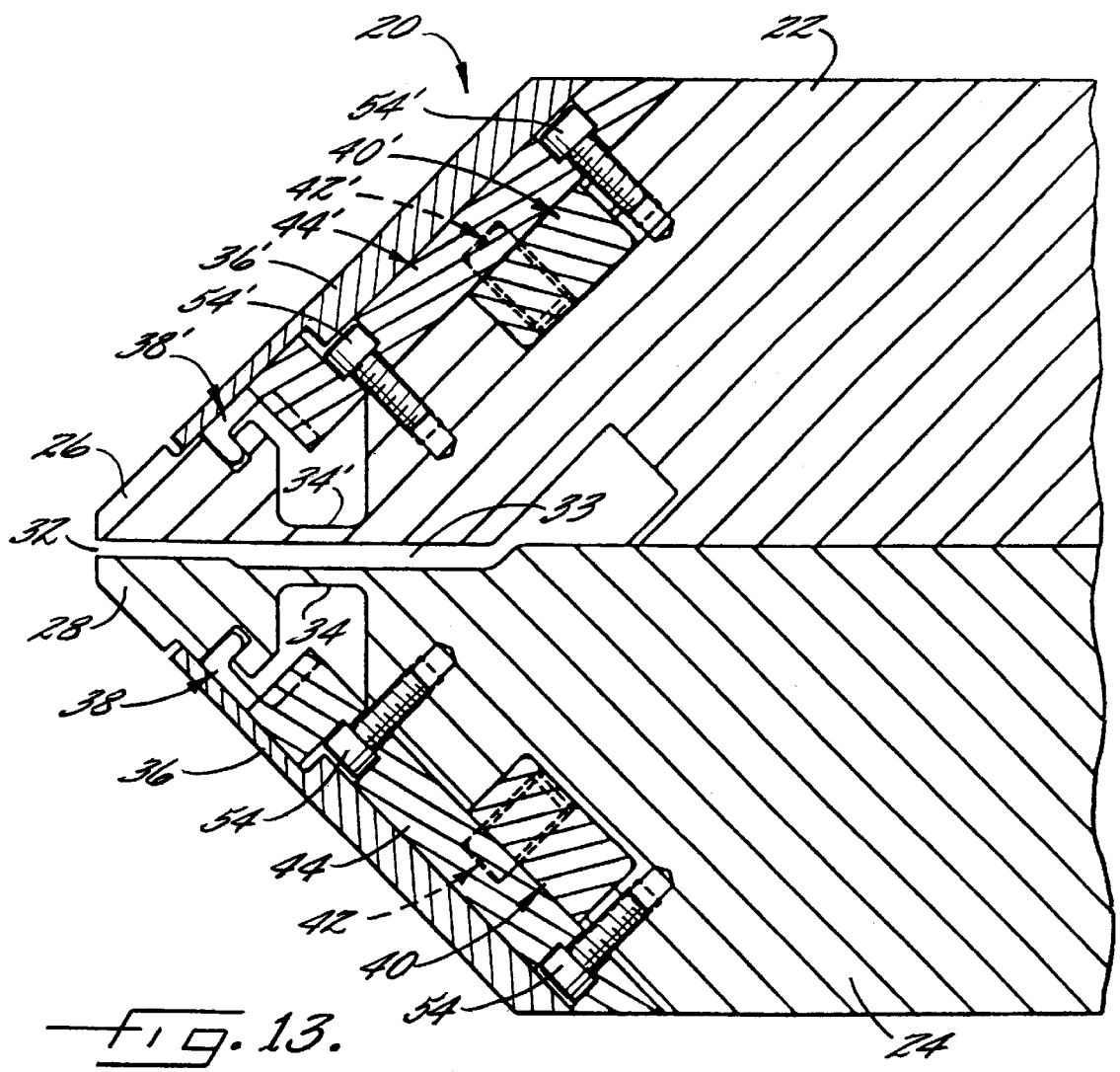
FIG. 13 is a cross-sectional view of an extrusion apparatus which includes adjustment means for both upper and lower flex lips, to which the present invention may be applied.

Referring to FIG. 13, in a further embodiment of the present invention, upper flex lip 26 is made adjustable by use of the lip-adjustment structure described earlier. Like numbers with prime notation added, are used in the Figure to designate like parts or structure. This variation allows even greater control over the gap opening, and profiling ability is increased since both the upper lip and lower lip may be adjusted.

Referring now to FIGS. 14–17, a modification of the control assembly of FIG. 1, is shown. Like numbers or letters with prime notation added, are used in FIGS. 14–17 to designate like parts or structure. Adjustment stud 48' includes a non-circular portion 81 which is beneficially hexagonal, as shown. A locking member 85 includes a throughbore 83 for receiving hexagonal portion 81, and throughbore 83 is suitably configured to be of the same cross-sectional shape as hexagonal portion 81. Shaped throughbore 83 is conveniently centrally located in the locking member. The locking member has a generally cylindrical shape, and includes a generally cylindrical tail portion 86 of reduced diameter for seating the locking member into a mating generally cylindrical recess 130 in side plate 46'. The locking member beneficially includes a plurality of radially elongated slots 59 for a plurality of retaining bolts 55' for securing the control assembly to side plate 46'. As in the embodiment of FIG. 1, hexagonal portion 81 and threaded stud end 63' project exterior to the side plate for alignment with and connection to other components.

Hexagonal portion 81 advantageously needs a lesser degree of rotation than square nut 47 requires for alignment with, and insertion into, its respective throughbore. Locking member 85 includes six generally equally spaced apart, radially elongated slots 59 for bolts 55'. The radially elongated slots facilitate alignment of bolts 55' with a plurality of threaded bores 131 in side plate 46' for receiving bolts 55'. Bores 131 are circumferentially disposed around recess 130, as shown in FIG. 17. The radius of each alignment slot 59 advantageously provides for approximately 30 degrees of alignment adjustment.

Figure 15:
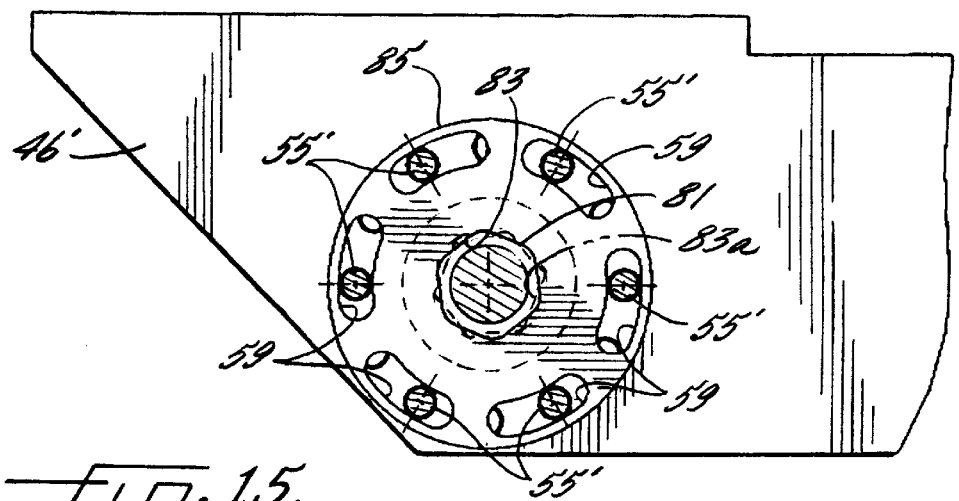
FIG. 15 is a cross-sectional view taken along the line 15—15 of FIG. 14.

In assembly, adjustment stud 48' and in particular hexagonal portion 81, are inserted into hexagonal throughbore 83 of locking member 85, and generally cylindrical tail portion 86 of locking member 85 is disposed within mating recess 130 of side plate 46'. Because alignment slots 59 provide for approximately 30 degrees of adjustment, slots 59 may thereafter be conveniently aligned with bores 131 in side plate 46', as indicated in FIG. 15. After threaded end 63' of adjustment stud 48' is threaded into an adjustment nut 50', a generally cylindrical retaining plate 89 is placed over a flange 65' of adjustment nut 50'; bolts 55' are passed through the peripherally located bores of retaining plate 89, and through alignment slots 59 of locking member 85; retaining plate 89 is rotated until bolts 55' are in alignment with bores 131 in side plate 46'; and bolts 55' are threaded into bores 131. In this way, as in the embodiment of FIG. 1, the adjustment stud is prevented from rotating and the actuator bar is moved generally laterally.

Figure 14:
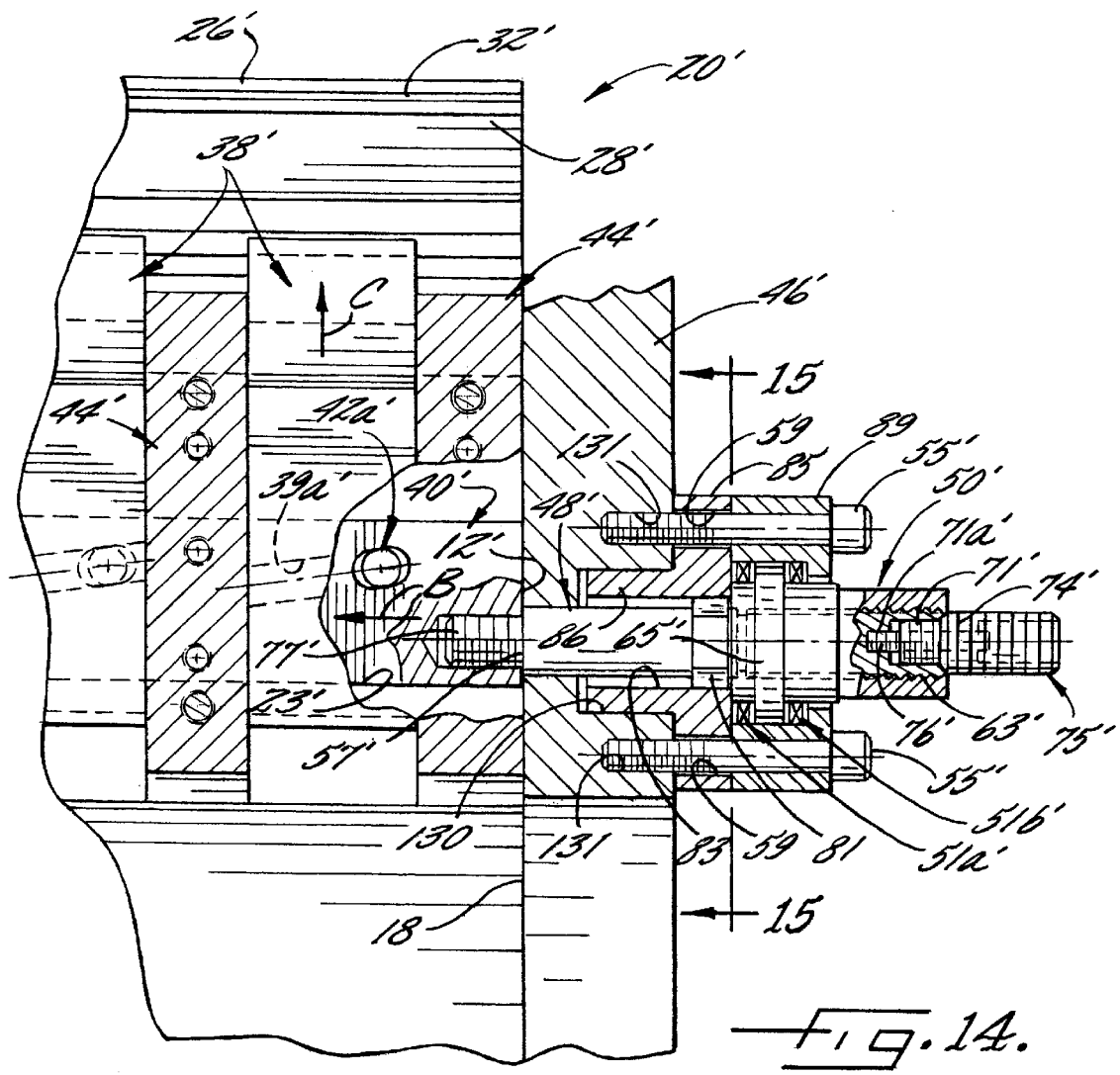
FIG. 14 is a partial front elevation view similar to FIG. 8 of an extrusion apparatus similar to that of FIG. 1, with a modified control assembly to which the present invention may be applied.

As can be understood from FIG. 14, as before, the adjustment stud is in axial alignment with the actuator bar and has an end threaded into a bore of the actuator bar, and the actuator bar moves in generally transversely disposed recess 23', for instance in direction B, shown in FIG. 14, upon counterclockwise rotation of the adjustment nut. As a result, abutment of shoulder 57' of the adjustment stud with face 12' of the actuator bar provides solid contact between the adjustment stud and actuator bar. Push/pull blocks 38' with angled slots 39' which slant as shown in FIG. 14, move in direction C, shown in FIG. 14, to close lip gap 32' when shoulder 57' pushes on actuator bar 40'.

A plurality of bores 131 in side plate 46' accommodates convenient alignment. Relatively more bores 131 are therefore better. In the embodiment of FIG. 17, twelve generally equidistantly spaced apart bores 131 are used. Use of multiple bores 131 in combination with radially elongated slots 59 greatly improves the likelihood for alignment of hexagonal portion 81 with its throughbore 83. If not, adjustment stud 48' could be rotated for alignment of non-circular portion 81 with bore 83; however, separation of shoulder 57' from actuator bar 40' is disadvantageous because of undesired back-lash or slopping. Even so, if rotation of an adjustment stud for orientation of hexagonal portion 81 or for some other purpose like removal and replacement of the adjustment stud, is desired, hexagonal portion 81 is beneficially positioned, as previously indicated, exterior to the side plate and within the locking member. Thus, when the locking member is removed, hexagonal portion 81 is accessible and may be rotated.

A more desirable alternative is a plurality of locking members 85, which differ from one another in the relative orientation of hexagonal throughbore 83 to slots 59, as illustrated in FIG. 15, which depicts in dashed line an alternatively oriented throughbore 83a. Accordingly, if the bore 83/slots 59 orientation of one of the plurality of locking members 85 does not provide alignment, a different locking member 85 may be tried. Less desirable alternatives, of course, exist.

In a variation of the present invention, a plurality of push only members in operable contact with the flex lip, are used in place of push/pull blocks 38. Use of push only members avoids lateral force applied to adjustment stud threads during a "pull" mode as in the embodiment of FIG. 1. The internal pressures of the apparatus and natural elasticity of the lip will assist in widening the lip gap when the push only members are retracted.

Figure 18:
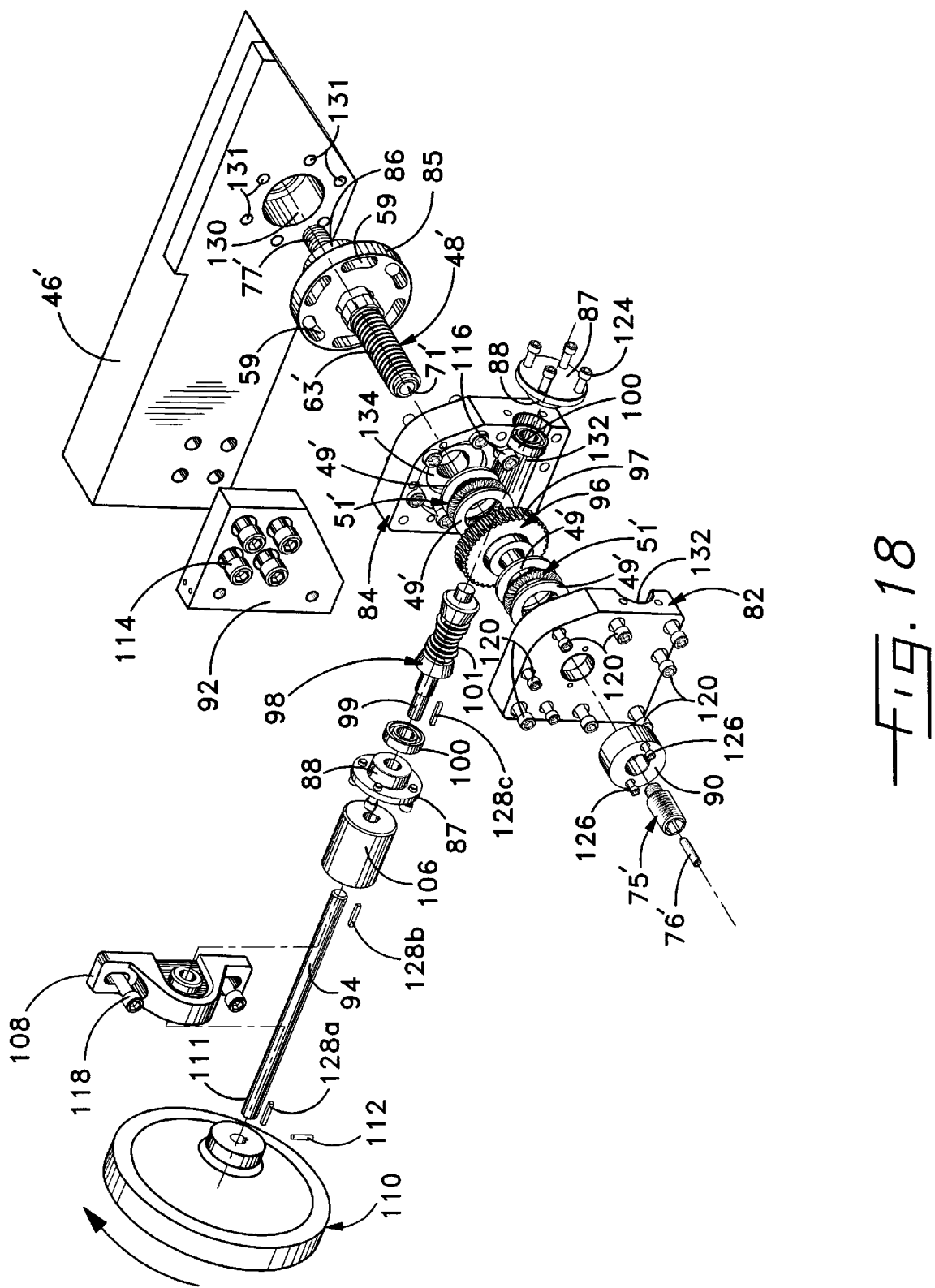
FIG. 18 is an exploded perspective view of components used in a preferred embodiment of a control assembly in accordance with the present invention.
Figure 19:
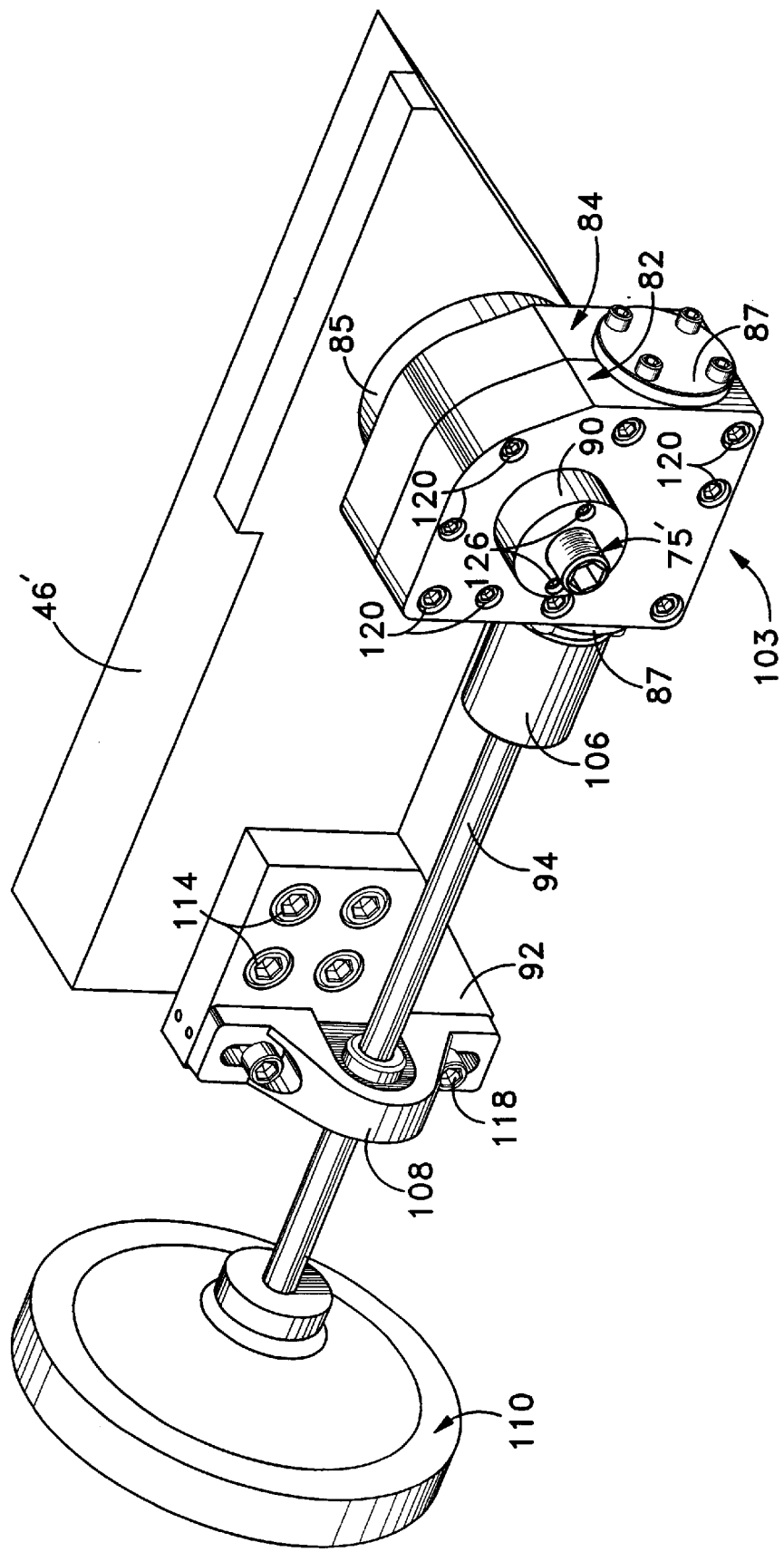
FIG. 19 is an assembled perspective view of the control assembly of FIG. 18.

In accordance with the present invention, FIGS. 18 and 19 illustrate a modification of the control assembly of FIG. 1, and in particular of FIGS. 14–17. Like parts or structure are again designated using like numbers with prime notation. As can be understood, this control assembly beneficially permits lip gap adjustment by an operator further removed from the exit slot and hot extrudate, and has applicability to a generally transversely movable member for lip gap adjustment.

As in the FIG. 1 embodiment, FIGS. 14–17 and indicated in FIGS. 18 and 19, threaded end 63' of the adjustment stud is disposed exterior to side plate 461, and opposite end 77' is threaded into the actuator bar, which, as before, moves in a generally transversely disposed recess (indicated as 23 in FIG. 4, and as 23' in FIG. 14) of the extrusion apparatus. With particular reference to FIG. 18, a gear wheel 96 is threaded on and engaged with stud end 63'. As gear wheel 96 rotates, stud end 63' threads into or out of the gear wheel depending upon the direction of rotation of the gear wheel.

A housing mount 84 is secured to locking member 85 by screws 116 which pass through elongated slots 59 of the locking member to bolt the housing mount and locking member onto side plate 46'. Thrust bearings 51' and thrust bearing washers 49' are positioned on stud end 63' so as to sandwich gear wheel 96, as shown in FIG. 18. A recess 134 in the housing mount receives the gear wheel; and a worm 98 on a shaft 99 is positioned in a recess 132 which communicates with recess 134 and is defined by the housing mount and a housing cover 82. Threads 101 of the worm engage with threads 97 of the gear wheel, so that the worm drives the gear wheel. Bearings 100 are positioned in recess 132 on opposite ends of worm shaft 99, and worm shaft caps 87 likewise disposed on opposite ends of shaft 99, secure these bearings in place.

Communicating recesses 132 and 134 provide for enclosure of the gear wheel, thrust bearings, thrust bearing washers, worm, worm shaft bearings, and inner ends 88 of the worm shaft caps by the housing mount and housing cover. The housing mount and housing cover, and the enclosed gear wheel and worm constitute a worm gear assembly 103, indicated in FIG. 19. Screws 120 secure the housing cover to the housing mount.

A hand wheel 110 or motor, beneficially positioned behind the extrusion apparatus and opposite the output end of the extrusion apparatus, as indicated in FIGS. 18 and 19, is connected to worm shaft 99 by an input shaft 94 and a shaft coupler 106. A set screw 112 locks the hand wheel to an input end 111 of shaft 94 opposite to shaft coupler 106. As indicated in FIGS. 18 and 19, input shaft end 111 extends in a direction opposite to the output end of the extrusion apparatus. Shaft keys 128 secure shaft ends as shown in FIG. 18. Shaft 94 passes through a pillow block bearing 108, and is mounted to a pillow block bridge mount 92 by screws 118. Screws 114 secure the pillow block bridge mount to side plate 46'.

As indicated in FIGS. 18 and 19, shaft 94 is in line with, and has a common axis with, the worm shaft. Beneficially, as also indicated in the FIGS. 18 and 19, the axis of shaft 94 is generally perpendicular to the axis of the adjustment stud and hence also to the direction of movement of the actuator bar. This generally perpendicular orientation advantageously places control of the actuator bar at a right angle to the direction of movement of the actuator bar. Also oriented generally perpendicular to that direction of movement is the axis of the worm shaft.

As in the embodiment of FIG. 1, a male end of indicator 75' is disposed in bore 71' of stud end 63'. A gauge cover 90 useful for referencing graduated markings on the indicator, surrounds the indicator and is attached to the housing cover by screws 126.

Rotation of the hand wheel produces rotation of the worm gear so that adjustment stud 48' threads into or out of the gear wheel and causes the actuator bar to move laterally at a generally perpendicular angle to the axis of shaft 94. Worm 98 and gear wheel 96 beneficially provide a "geared down" mechanism by which several turns of the hand wheel are needed for a single rotation of the gear wheel. This allows fine adjustments of the lip gap even with full rotation of the handwheel. The hand wheel may include a counter to record the number of revolutions. Efficient calibration may result so that an operator can predict movement of the flex lip.

Figure 20:
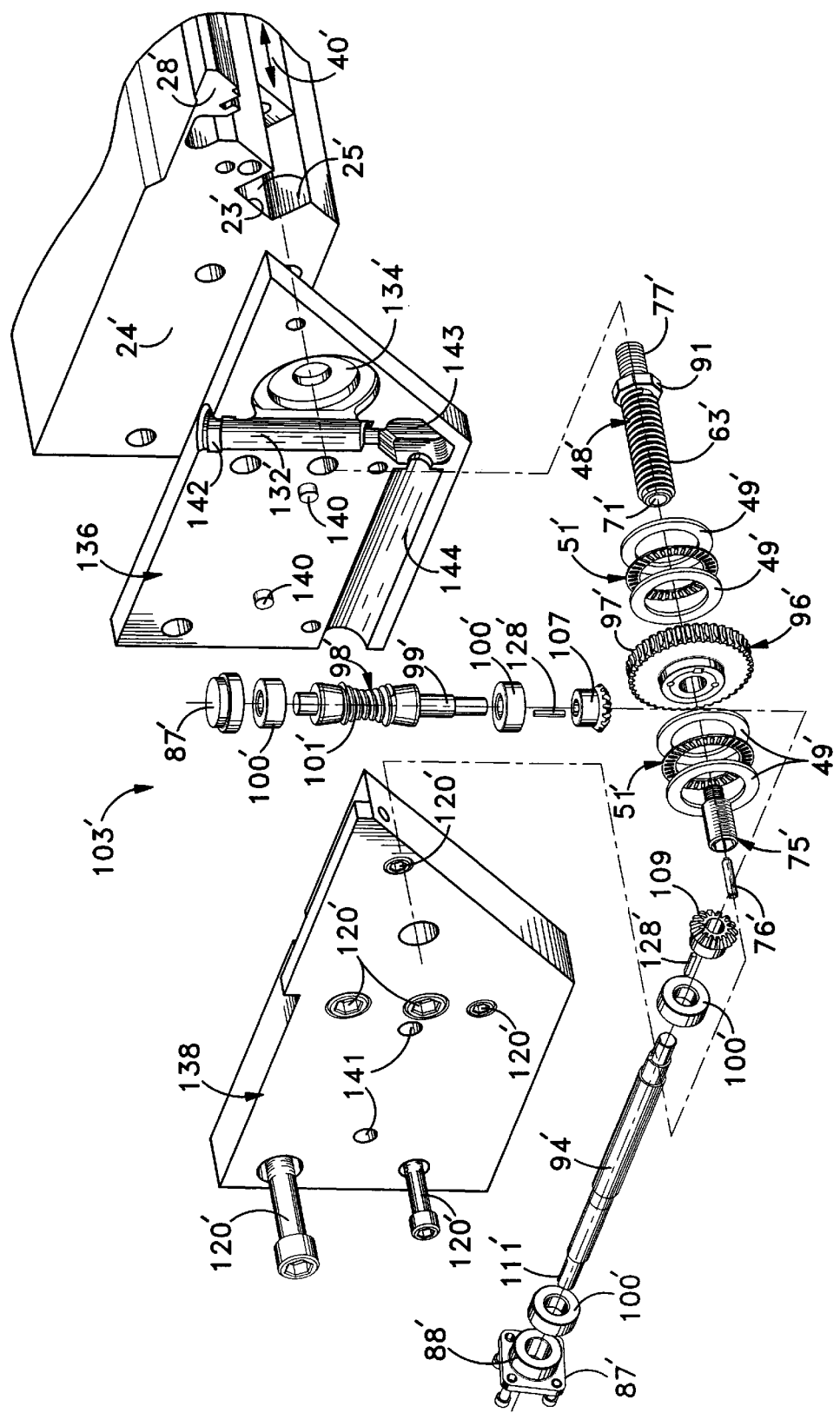
FIG. 20 is an exploded perspective view of a further preferred embodiment of a control assembly in accordance with the present invention.
Figure 21:
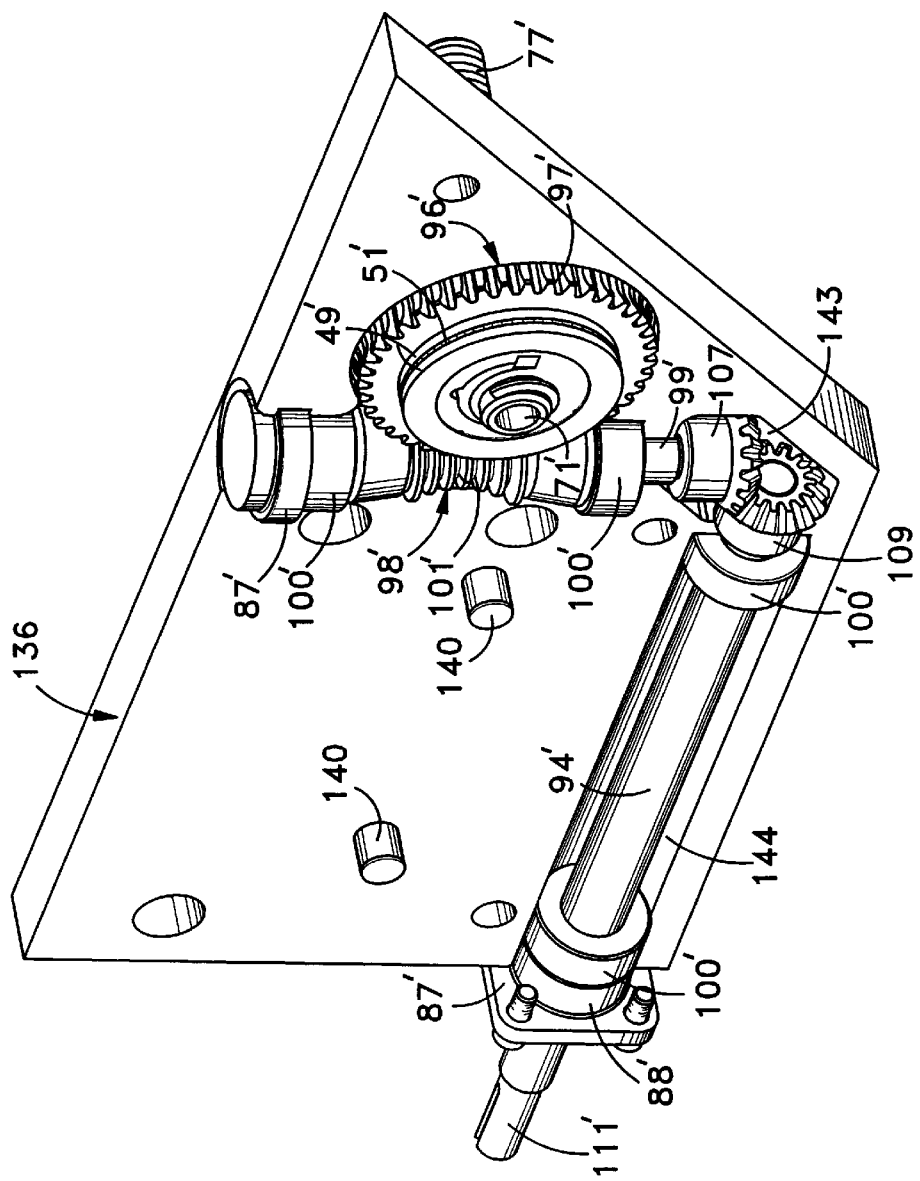
FIG. 21 is an assembled perspective view of the control assembly of FIG. 20.

In accordance with the present invention, FIGS. 20 and 21 illustrate a simplification of the actuator control assembly of FIGS. 18–19. Like parts or structures are again designated using like numbers with prime notation. As can be understood, this control assembly is beneficially like that of FIGS. 18–19 in that lip adjustment is effected from a location removed from the die lip output.

Referring particularly to FIG. 20, an octahedral portion 91 of adjustment stud 48' is positioned in contact with one or more walls 25' of generally longitudinally disposed recess 23' of lower die body 24', to prevent rotation of the adjustment stud. As a result, there is no need for a separate locking member as in prior embodiments. As before, the stud is engaged, and in axial alignment, with actuator bar 40', and gear wheel 96' is threaded on and engaged with stud end 63' so that as the gear wheel rotates, stud end 63' threads into or out of the gear wheel and the actuator bar is moved laterally, depending upon the direction of rotation of the gear wheel. Thrust bearings 51' and thrust bearing washers 49' are positioned on stud end 63' so as to sandwich the gear wheel, as shown.

Recess 134' in a mounting plate 136 receives the gear wheel; and worm 98' on worm shaft 99' is positioned in recess 132' which communicates with recess 134' and is defined by mounting plate 136 and a cover plate 138. Worm threads 101' engage with threads 97' of the gear wheel so that rotation of the worm drives the gear wheel. A miter gear 107 is secured on an end of worm shaft 99'. Engaged with miter gear 107 at about 90° is a second miter gear 109, which is secured to an end of input shaft 94'. In this way, shaft 94' is oriented generally perpendicular to the worm shaft. Also, as may be understood from FIGS. 20 and 21, generally perpendicular shaft 94' and the worm shaft define a plane oriented generally perpendicular to the axis of the adjustment stud.

Bearings 100' are positioned in recess 132' on opposite ends of worm shaft 99', and secured in place by worm shaft cap 87' and miter gear 107, which are likewise on opposite shaft ends. The worm shaft cap is disposed in an extension 142 of recess 132'; and miter gear 107 is disposed in a recess 143 which communicates with recess 132' and is defined by the mounting plate and cover plate. Also in recess 143 is miter gear 109. Positioned on opposite ends of shaft 94' are bearings 100', which are secured in place, as shown, by miter gear 109 and shaft cap 87'. A portion of shaft 94', the shaft bearings and inner end 88' of the shaft cap are beneficially disposed in a recess 144, which communicates with recess 143 and is defined by the mounting plate and cover plate. Recess 144 advantageously supports the portion of shaft 94' disposed within the recess. Shaft keys 128' secure miter gear 109 to shaft 94', and secure miter gear 107 to worm shaft 99'.

A hand wheel or motor (not shown), beneficially positioned behind the extrusion apparatus and opposite the output end of the extrusion apparatus, is secured to input end 111' of shaft 94'. As shown in FIG. 21, input shaft end 111' projects through shaft cap 87' for connection with the hand wheel or motor, and extends in a direction opposite to the output end of the extrusion apparatus. Beneficially, as indicated earlier, the axis of shaft 94' is oriented generally perpendicular to the axis of the adjustment stud, and hence also to the direction of movement of the axially aligned, actuator bar. Thus, rotation of shaft 94' causes the adjustment stud and actuator bar to move laterally at a generally perpendicular angle to the axis of shaft 94'. The generally perpendicular orientation advantageously places actuator bar control at a right angle to the direction of movement of the actuator bar.

Communicating recesses 134', 132', 142, 143 and 144 provide for enclosure of the gear wheel, thrust bearings, thrust bearing washers, worm, worm shaft bearings, bearings for shaft 94', miter gears, shaft cap inner end 88', and a portion of shaft 94', by the cover plate and mounting plate, which together constitute a rail end plate. The cover plate, mounting plate and the enclosed gear wheel and worm constitute a worm gear assembly 103', indicated in FIG. 20.

Pins 140, which extend from the mounting plate, cooperate with apertures 141 in the cover plate to assist alignment of the cover plate and mounting plate. Bolts (not shown) secure the mounting plate to lower die body 24', and bolts 120' secure the cover plate to the mounting plate.

A further embodiment of the present invention is shown in FIG. 22. Like parts or structures are again designated using like numbers with prime notation. Worm gear head assemblies 103*a,b*, each provided with a gear like worm gear 96 and a worm like worm 98, are secured to side plates 46'. Hand wheel 110' or a motor simultaneously operates both worm gear head assemblies. The hand wheel is connected to a T-gear head 105*a* by a first input shaft 94', and thereafter to worm gear head assembly 103*a* by a second input shaft 94', which, as shown, has a common axis with the first input shaft. As before, the hand wheel is fixed on an input shaft end which extends in a direction opposite to the output end of the extrusion apparatus. T-gear head 105*a* is connected to a T-gear head 105*b* by a connecting shaft 95, and T-gear head 105*b* is connected to worm gear head assembly 103*b* by another input shaft 94'. Couplers 106' function as before; and as before, shafts 94' are oriented generally perpendicular to the direction of movement of the actuator bar. Connecting shaft 95 is oriented generally parallel to the direction of movement of the actuator bar.

Rotation of hand wheel 110' results in rotation of the respective gears and worms of assemblies 103*a,b*. Rotation of the gear and worm of assembly 103*a* is opposite to that of the gear and worm of assembly 103*b* so that assembly 103*a* pushes upon its respective adjustment stud and assembly 103*b* simultaneously pulls its respective adjustment stud. The force required per gear assembly is thereby significantly reduced.

As will be understood by one skilled in the art, the hand wheel or motor can, if desired, directly drive gear head 105*b*, instead of gear head 105*a*, in which case gear head 105*b* drives gear head 105*a* via connecting shaft 95. Furthermore, it will be likewise understood that the handwheel or motor can be located between gear heads 105*a*, 105*b* and fixed on an input shaft as before, so as to directly drive shaft 95 which thereupon would drive gear heads 105*a,b*.

While particular embodiments of the invention have been shown and described, it will be appreciated by those skilled in the art that modifications may be made without departing from the invention in its broader aspects and as set forth in the following claims.

We claim:

1. An extrusion apparatus comprising
  a body portion comprising a flex lip which forms in part a gap of an exit slot defining an output end of a flow passageway;
  a sliding member disposed in contact with said body portion, and operatively connected to said flex lip for flexing said flex lip for adjustment of said exit slot gap; and
  an assembly for reciprocally moving said sliding member in a direction transverse to said gap, said assembly comprising a drive assembly comprising a gear on a reciprocally movable elongated member that connects said drive assembly with said sliding member, a rotatable shaft operatively connected to said gear, and a shaft-driving member operatively connected to said rotatable shaft at a location opposite said output end of said extrusion apparatus.

2. The extrusion apparatus of claim 1, wherein said gear comprises a wheel rotatably mounted on said elongated member.

3. The extrusion apparatus of claim 2 wherein said drive assembly further comprises a worm on a worm shaft, and wherein said wheel is engaged by said worm, and said shaft-driving member is a handwheel.

4. The extrusion apparatus of claim 1, wherein said rotatable shaft is supported by an end plate adjacent said body portion.

5. The extrusion apparatus of claim 3, wherein said gear is disposed in a housing exterior to and attached to an end plate adjacent said body portion, and said rotatable shaft is disposed in line with said worm shaft.

6. The extrusion apparatus of claim 1, wherein the reciprocally movable, sliding member is an actuator bar disposed in a recess in said body portion, wherein said elongated member moves with said sliding member in said transverse direction, and wherein said rotatable shaft is disposed generally perpendicular to said sliding member.

7. An extrusion apparatus comprising
  a body portion comprising a flex lip which forms in part a gap of an exit slot defining an output end of said extrusion apparatus;
  a reciprocally movable member slidingly disposed in contact with said body portion, and operatively connected to said flex lip for flexing said flex lip for adjustment of said exit slot gap; and
  an assembly for reciprocally moving said reciprocally movable member, said assembly comprising a drive assembly comprising a gear operatively connected to said reciprocally movable member, and a rotatable shaft operatively connected to said gear, wherein said rotatable shaft is disposed generally perpendicular to the reciprocally movable member, and a portion of said rotatable shaft is received within and supported by a recess of an end plate adjacent said body portion.

8. The extrusion apparatus of claim 7, wherein said reciprocally movable member is disposed in a generally transversely disposed recess in said body portion.

9. The extrusion apparatus of claim 7, wherein a handwheel for rotating said rotatable shaft is mounted at a location opposite said output end of said extrusion apparatus.

10. The extrusion apparatus of claim 7, wherein said gear comprises a gear wheel disposed in another recess of said end plate, and said gear wheel is rotatably mounted on an elongated member that is reciprocally movable and in threaded connection with said reciprocally movable member.

11. The extrusion apparatus of claim 10, wherein said drive assembly further comprises a worm on a worm shaft, and wherein said gear wheel is engaged by said worm and said worm is disposed in yet another recess of said end plate.

12. The extrusion apparatus of claim 7, wherein said drive assembly further comprises a worm on a worm shaft, and said rotatable shaft is disposed relative to said worm shaft in a position selected from generally perpendicular to said worm shaft and in line with said worm shaft.

13. The extrusion apparatus of claim 11, wherein said drive assembly further comprises a first gear on an end of said worm shaft, and a second gear on an output end of said rotatable shaft and in generally perpendicular engagement with said first gear, wherein said first gear and said second gear are disposed in an end plate recess communicating with said recess for the rotatable shaft portion and with said recess for said worm, and wherein said rotatable shaft is generally perpendicular to said worm shaft.

14. The extrusion apparatus of claim 12, wherein said rotatable shaft is generally perpendicular to said worm shaft.

15. The extrusion apparatus of claim 7, wherein a shaft-driving member is connected to said rotatable shaft at a location opposite said output end of said extrusion apparatus.

16. The extrusion apparatus of claim 7, further comprising a plurality of push-pull blocks connecting said reciprocally movable member to said flex lip.

17. An extrusion apparatus comprising a body portion comprising a flex lip which forms in part a gap of an exit slot defining an output end of said extrusion apparatus, a reciprocally movable member operatively connected to said flex lip and having a first direction of movement, for flexing said flex lip for adjustment of said gap, a first gear assembly operatively connected to a first end of said reciprocally movable member for moving said reciprocally movable member in said first direction, a second gear assembly operatively connected to an opposite end of said reciprocally movable member for likewise moving said reciprocally movable member in said first direction, and a control assembly comprising a first rotatable shaft operatively connected to said first gear assembly and a second rotatable shaft operatively connected to said second gear assembly for simultaneously operating said first gear assembly and said second gear assembly to move said reciprocally movable member in said first direction.

18. The extrusion apparatus of claim 17, wherein said control assembly comprises a third rotatable shaft connected to said first rotatable shaft and to said second rotatable shaft, and said reciprocally movable member is in sliding contact with said body portion.

19. The extrusion apparatus of claim 17, wherein a shaft-driving member operatively connected to said first and said second rotatable shafts, is at a location opposite said output end of said extrusion apparatus.

20. The extrusion apparatus of claim 17, wherein said reciprocally movable member is a sliding member, wherein said sliding member is disposed in a recess in said body portion, and wherein an end plate is adjacent said body portion and said first rotatable shaft is supported by said end plate.

* * * * *